(12) United States Patent
Metius et al.

(10) Patent No.: US 8,685,136 B2
(45) Date of Patent: Apr. 1, 2014

(54) SYSTEM AND METHOD FOR REDUCING IRON OXIDE TO METALLIC IRON USING COKE OVEN GAS AND OXYGEN STEELMAKING FURNACE GAS

(75) Inventors: Gary E. Metius, Charlotte, NC (US); James M. McClelland, Jr., Cornelius, NC (US); David C. Meissner, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 120 days.

(21) Appl. No.: 13/363,044

(22) Filed: Jan. 31, 2012

(65) Prior Publication Data
US 2012/0125159 A1 May 24, 2012

Related U.S. Application Data

(63) Continuation-in-part of application No. 13/107,013, filed on May 13, 2011, now Pat. No. 8,496,730.

(60) Provisional application No. 61/334,786, filed on May 14, 2010.

(51) Int. Cl.
*C21B 9/14* (2006.01)
*C21B 15/02* (2006.01)

(52) U.S. Cl.
USPC ............... 75/489; 75/490; 75/505; 266/156; 266/197

(58) Field of Classification Search
USPC ................. 75/489, 490, 505; 266/156, 197
See application file for complete search history.

(56) References Cited

U.S. PATENT DOCUMENTS

| | | | | |
|---|---|---|---|---|
| 4,333,761 A * | 6/1982 | Ahrendt et al. | | 75/496 |
| 4,793,856 A * | 12/1988 | Price-Falcon et al. | | 75/490 |
| 4,822,411 A | 4/1989 | Standler et al. | | |
| 4,889,323 A * | 12/1989 | Pusch et al. | | 266/142 |
| 6,986,800 B2 * | 1/2006 | Duarte-Escareno et al. | | 75/458 |
| 2002/0179493 A1 * | 12/2002 | Etter | | 208/131 |

OTHER PUBLICATIONS

Peter Diemer, Klaus Knop, Hans Bodo Lungen, Martin Reinke, Carl-Dieter Wuppermann; "Utilization of Coke Oven Gas for the Production of DRI" (Technik + Trends—Metallurgic); Stahl and Eisen 127 (2007) Nr. 1; Paper presented at STAHL 2006 Conference on Nov. 9, 2006 in Dusseldorf.

* cited by examiner

*Primary Examiner* — George Wyszomierski
*Assistant Examiner* — Tima M McGuthry Banks
(74) *Attorney, Agent, or Firm* — Clements Bernard PLLC; Christopher L. Bernard; Lawrence A. Baratta, Jr.

(57) ABSTRACT

A process for reducing iron oxide to metallic iron using coke oven gas (COG), including: a direct reduction shaft furnace for providing off gas; a COG source for injecting COG into a reducing gas stream including at least a portion of the off gas; and the direct reduction shaft furnace reducing iron oxide to metallic iron using the reducing gas stream and injected COG. The COG has a temperature of about 1,200 degrees C. or greater upon injection. The COG has a $CH_4$ content of between about 2% and about 13%. Preferably, the COG is reformed COG. Optionally, the COG is fresh hot COG. The COG source includes a partial oxidation system. Optionally, the COG source includes a hot oxygen burner.

23 Claims, 3 Drawing Sheets

SYSTEM AND METHOD FOR REDUCING IRON OXIDE TO METALLIC IRON USING COKE OVEN GAS AND OXYGEN STEELMAKING FURNACE GAS

CROSS-REFERENCE TO RELATED APPLICATION

The present non-provisional patent application/patent is a continuation-in-part of U.S. patent application Ser. No. 13/107,013 (now U.S. Pat. No. 8,496,730), filed on May 13, 2011, and entitled "SYSTEM AND METHOD FOR REDUCING IRON OXIDE TO METALLIC IRON USING COKE OVEN GAS AND OXYGEN STEELMAKING FURNACE GAS," which claims the benefit of priority of U.S. Provisional Patent Application No. 61/334,786, filed on May 14, 2010, and entitled "SYSTEM AND METHOD FOR REDUCING IRON OXIDE TO METALLIC IRON USING COKE OVEN GAS AND OXYGEN STEELMAKING FURNACE GAS," the contents of both of which are incorporated in full by reference herein.

FIELD OF THE INVENTION

The present invention relates generally to a novel system and method for reducing iron oxide to metallic iron in an integrated steel mill or the like that has a coke oven and/or an oxygen steelmaking furnace. More specifically, the present invention relates to a novel system and method for reducing iron oxide to metallic iron using coke oven gas and oxygen steelmaking furnace gas.

BACKGROUND OF THE INVENTION

Integrated steel mills and the like typically have coke ovens and/or oxygen steelmaking furnaces and use excess associated gases for heating and power generation. In many applications, it would be desirable to use the associated coke oven gas (COG) and/or the associated basic oxygen furnace gas (BOFG) to reduce iron oxide to metallic iron, in the form of direct reduced iron (DRI), hot direct reduced iron (HDRI), or hot briquetted iron (HBI). Both COG and BOFG contain significant percentages of carbon monoxide (CO) and hydrogen ($H_2$), which are the primary reductants for reducing iron oxide to metallic iron. The COG also contains 20+% methane ($CH_4$), which, under the proper conditions, may be reformed with carbon dioxide ($CO_2$) and water ($H_2O$) to form CO and $H_2$. BOFG may contain up to 20% nitrogen ($N_2$), which may build up to very high levels in a recirculating system, for example.

BRIEF SUMMARY OF THE INVENTION

In various exemplary embodiments, the present invention provides an economical process for the direct reduction of iron ore when the external source of reductants is one or both of COG and BOFG, the latter also known as oxygen steelmaking furnace gas. $CO_2$ is removed from a mixture of shaft furnace off gas, obtained from a conventional direct reduction shaft furnace, well known to those of ordinary skill in the art, and BOFG. This $CO_2$ lean gas is then mixed with clean COG, humidified, and heated in an indirect heater. Oxygen ($O_2$) is then injected into the heated reducing gas to further increase its temperature. This hot reducing gas flows to the direct reduction shaft furnace, where $CH_4$ in the hot reducing gas undergoes reforming by contact with the DRI/HDRI, followed by reduction of the iron oxide. The spent hot reducing gas exits the direct reduction shaft furnace as shaft furnace off gas, produces steam in a waste heat boiler, is cleaned in a cooler scrubber, and is compressed and recycled to join fresh BOFG. A portion of the shaft furnace off gas is sent to the heater burners.

Other contemplated uses for the BOFG include as a supplement to the cleaned/cooled shaft furnace off gas for use as the top gas fuel for the indirect heater. Similarly, the COG may be used for a variety of other purposes as well. The COG that is heated in the indirect heater is preferably first cleaned of complex hydrocarbons that would foul the indirect heater via oxidation processing (i.e. partial combustion) or the like (thereby correspondingly reducing, and potentially eliminating, the need for BOFG supplementation). COG with or without the complex hydrocarbons may also be used to supplement the top gas fuel for the indirect heater, as direct reduction shaft furnace transition zone injection gas, and/or to enrich the ultimate reducing gas stream. All of these possibilities, which are not mutually exclusive and may be used in any combination, are described in greater detail herein below.

One object of the present invention is to maximize the amount of DRI, HDRI, or HBI that may be produced from a given quantity of COG and/or BOFG.

Another object of the present invention is to provide an efficient process given varying quantities of COG and/or BOFG.

A further object of the present invention is to minimize equipment, and hence, plant cost by eliminating an external catalytic reformer, which would be used to generate CO and $H_2$ by reforming $CH_4$ in the COG with oxidants from the shaft furnace off gas and BOFG. Heating the mixture of $CO_2$ lean gas, $CO_2$ lean BOFG, and COG in an indirect heater followed by $O_2$ injection and reforming in the direct reduction shaft furnace is less expensive than the use of the external catalytic reformer.

A still further object of the present invention is to allow the operation of the direct reduction shaft furnace at a lower pressure than would otherwise be allowable, as the $CH_4$ level in the hot reducing gas delivered to the direct reduction shaft furnace is lowered by adding the BOFG.

A still further object of the present invention is to limit the buildup of $N_2$ to an acceptable level by utilizing a portion of the spent hot reducing gas as indirect heater fuel.

In one exemplary embodiment, the present invention provides a novel system for reducing iron oxide to metallic iron using coke oven gas (COG) and oxygen steelmaking furnace gas (BOFG), including: a direct reduction shaft furnace for providing off gas; a BOFG source for providing BOFG; a carbon dioxide ($CO_2$) removal system for removing $CO_2$ from a mixture of the off gas and the BOFG; a COG source for mixing a resulting $CO_2$ lean gas with COG; and the direct reduction shaft furnace reducing iron oxide to metallic iron using a resulting reducing gas. The system also includes a saturator for adjusting the moisture content of the resulting reducing gas prior to it being used in the direct reduction shaft furnace. The system further includes an indirect heater for heating the resulting reducing gas prior to it being used in the direct reduction shaft furnace. Optionally, a fuel gas for the indirect heater comprises a portion of the off gas and a portion of one or more of the COG and the BOFG. The system still further includes an oxygen source for adding oxygen to the resulting reducing gas prior to it being used in the direct reduction shaft furnace. Optionally, the system still further includes a conduit for communicating a portion of the COG from the COG source to the resulting reducing gas prior to it being used in the direct reduction shaft furnace. Optionally, the system still further includes a conduit for communicating a portion of the COG from the COG source to a transition zone of the direct reduction shaft furnace. Optionally, the system still further includes a partial oxidation reactor for removing complex hydrocarbons from the COG prior to it being mixed with the $CO_2$ lean gas. Preferably, an amount of the BOFG used is dependent upon an amount and composition of the COG used.

In another exemplary embodiment, the present invention provides a novel method for reducing iron oxide to metallic iron using coke oven gas (COG) and oxygen steelmaking furnace gas (BOFG), including: obtaining off gas from a direct reduction shaft furnace; obtaining BOFG from a BOFG source; removing carbon dioxide ($CO_2$) from a mixture of the off gas and the BOFG; mixing a resulting $CO_2$ lean gas with COG from a COG source; and reducing iron oxide to metallic iron in the direct reduction shaft furnace using a resulting reducing gas. The method also includes adjusting the moisture content of the resulting reducing gas using a saturator prior to it being used in the direct reduction shaft furnace. The method further includes heating the resulting reducing gas using an indirect heater prior to it being used in the direct reduction shaft furnace. Optionally, a fuel gas for the indirect heater comprises a portion of the off gas and a portion of one or more of the COG and the BOFG. The method still further includes adding oxygen to the resulting reducing gas using an oxygen source prior to it being used in the direct reduction shaft furnace. Optionally, the method still further includes communicating a portion of the COG from the COG source to the resulting reducing gas using a conduit prior to it being used in the direct reduction shaft furnace. Optionally, the method still further includes communicating a portion of the COG from the COG source to a transition zone of the direct reduction shaft furnace using a conduit. Optionally, the method still further includes removing complex hydrocarbons from the COG prior to it being mixed with the $CO_2$ lean gas using a partial oxidation reactor. Preferably, an amount of the BOFG used is dependent upon an amount and composition of the COG used.

In a further exemplary embodiment, the present invention provides a method for reducing iron oxide to metallic iron, including: obtaining off gas from a direct reduction shaft furnace; obtaining basic oxygen furnace gas (BOFG) from a BOFG source; removing carbon dioxide ($CO_2$) from a mixture of the off gas and the BOFG; and reducing iron oxide to metallic iron in the direct reduction shaft furnace using a resulting $CO_2$ lean gas. Optionally, the method also includes mixing the resulting $CO_2$ lean gas with coke oven gas (COG) from a COG source prior to using it as a reducing gas. Optionally, the method further includes removing complex hydrocarbons from the COG prior to it being mixed with the resulting $CO_2$ lean gas.

In a still further exemplary embodiment, the present invention provides a method for reducing iron oxide to metallic iron, including: obtaining off gas from a direct reduction shaft furnace; mixing the off gas with coke oven gas (COG) from a COG source; and reducing iron oxide to metallic iron in the direct reduction shaft furnace using a resulting reducing gas. Optionally, the method also includes: obtaining basic oxygen furnace gas (BOFG) from a BOFG source; removing carbon dioxide ($CO_2$) from a mixture of the off gas and the BOFG; and mixing a resulting $CO_2$ lean gas with the COG from the COG source. Optionally, the method further includes removing complex hydrocarbons from the COG prior to it being mixed with the $CO_2$ lean gas.

In a still further exemplary embodiment, the present invention provides a system for reducing iron oxide to metallic iron using coke oven gas (COG), including: a direct reduction shaft furnace for providing off gas; a COG source for injecting COG into a reducing gas stream including at least a portion of the off gas; and the direct reduction shaft furnace reducing iron oxide to metallic iron using the reducing gas stream and injected COG. The COG has a temperature of about 1,200 degrees C. or greater upon injection. The COG has a $CH_4$ content of between about 2% and about 13%. Preferably, the COG is reformed COG. Optionally, the COG is fresh hot COG. The COG source includes a partial oxidation system. Optionally, the COG source includes a hot oxygen burner. Optionally, the system still further includes a basic oxygen furnace gas (BOFG) source for injecting BOFG into the off gas that forms at least a portion of the reducing gas stream. Optionally, the system still further includes a carbon dioxide ($CO_2$) removal system for removing $CO_2$ from the mixture of the off gas and the BOFG.

In a still further exemplary embodiment, the present invention provides a method for reducing iron oxide to metallic iron using coke oven gas (COG), including: providing a direct reduction shaft furnace for providing off gas; providing a COG source for injecting COG into a reducing gas stream including at least a portion of the off gas; and the direct reduction shaft furnace reducing iron oxide to metallic iron using the reducing gas stream and injected COG. The COG has a temperature of about 1,200 degrees C. or greater upon injection. The COG has a $CH_4$ content of between about 2% and about 13%. Preferably, the COG is reformed COG. Optionally, the COG is fresh hot COG. The COG source includes a partial oxidation system. Optionally, the COG source includes a hot oxygen burner. Optionally, the method still further includes providing a basic oxygen furnace gas (BOFG) source for injecting BOFG into the off gas that forms at least a portion of the reducing gas stream. Optionally, the method still further includes providing a carbon dioxide ($CO_2$) removal system for removing $CO_2$ from the mixture of the off gas and the BOFG.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
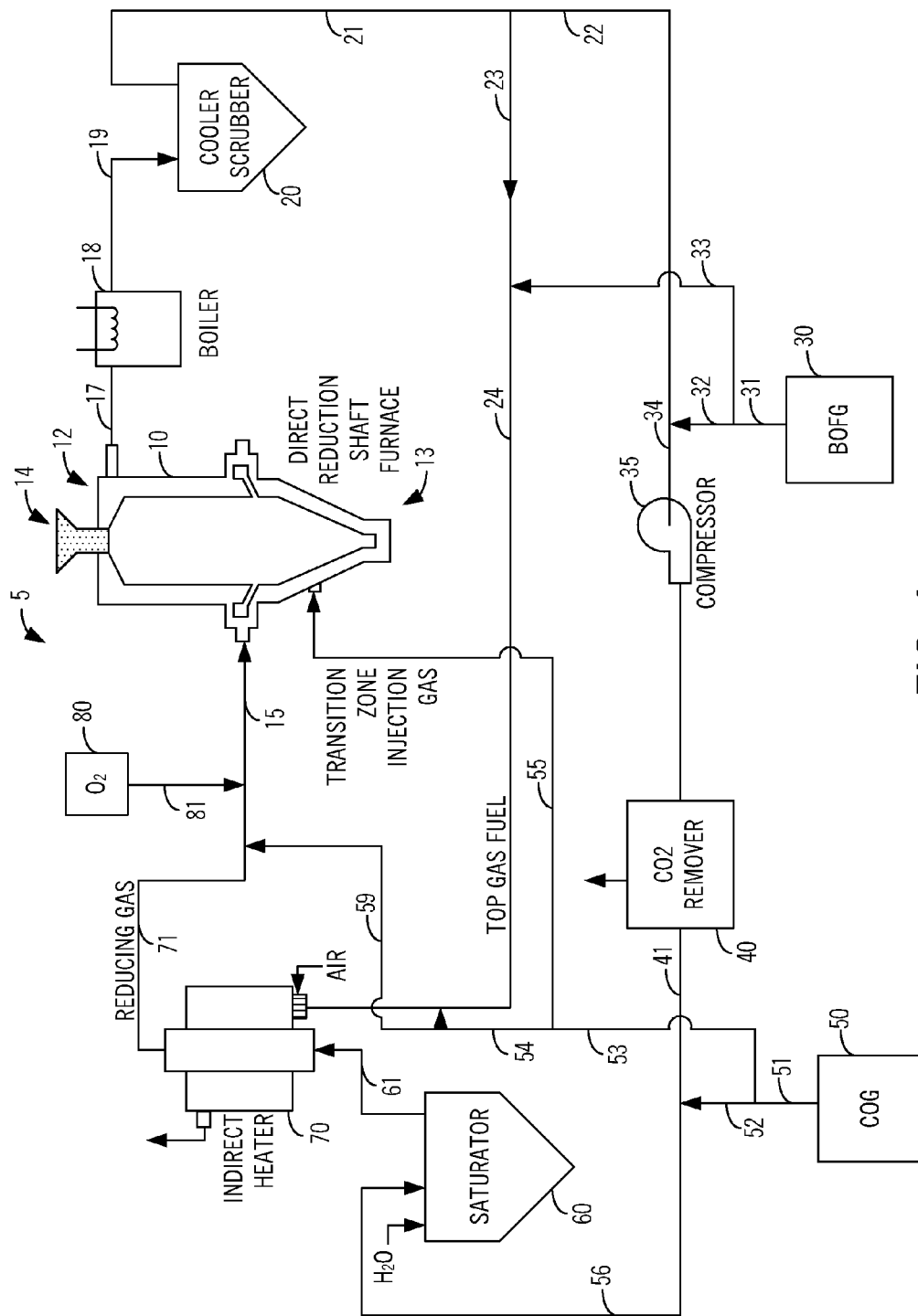
FIG. 1 is a schematic diagram illustrating one exemplary embodiment of the novel system and method for reducing iron oxide to metallic iron using COG and/or BOFG of the present invention.

Referring specifically to FIG. 1, in one exemplary embodiment, the novel system and method for reducing iron oxide to metallic iron using COG and/or BOFG (system and method collectively 5) of the present invention includes individual components that are well known to those of ordinary skill in the art, and thus they are not illustrated or described in excessive detail herein, but that are combined together in an inventive process. These components include, but are not limited to, a conventional direct reduction shaft furnace 10, a waste heat boiler 18, a cooler scrubber 20, a BOFG source 30 (and/or appropriate storage vessel), a $CO_2$ removal system 40, a COG source 50 (and/or appropriate storage vessel), a saturator 60, an indirect heater 70, and an oxygen source 80 (and/or appropriate storage vessel).

The direct reduction shaft furnace 10 has an upper end where iron ore in the form of pellets, lumps, aggregates, etc. 14 is fed. The reduced pellets, lumps, aggregates, etc. 14 are removed at a lower end 13 of the direct reduction shaft furnace 10 as DRI. A reducing gas inlet conduit 15 is located between the feed charge and the product discharge, and supplies hot reducing gas to the direct reduction shaft furnace 10. This hot reducing gas contains $CH_4$, which is reformed near the gas inlet section of the direct reduction shaft furnace 10 by $CO_2$ and $H_2O$ contained in the hot reducing gas to produce additional CO and $H_2$. The HDRI acts as a catalyst in the reforming reaction. Following this reforming reaction, the hot reducing gas containing CO and $H_2$ reduces the iron oxide to metallic iron and exits the direct reduction shaft furnace 10 as spent reducing gas through an offtake conduit at the top of the direct reduction shaft furnace 10 flowing into a duct 17 to the waste heat boiler 18, and then to the cooler scrubber 20. The steam generated in the waste heat boiler 18 provides the majority of the regeneration heat for the $CO_2$ removal system 40, for example. The cooler scrubber 20 cools and cleans the spent off gas, which exits the cooler scrubber through a conduit 21.

Next, a portion of the cooled off gas enters another conduit 23 and flows to the burners of the indirect heater 70. A portion of the cooled off gas also enters a further conduit 22 and joins a conduit 32 from the BOFG source 30, forming another conduit 34 that flows to a compressor 35. The compressed gas from the compressor 35 flows to the $CO_2$ removal system 40, where $CO_2$ is scrubbed from the gas. The $CO_2$ lean gas in the conduit 41 is then enhanced by COG from another conduit 52, and then enters a further conduit 56, which flows to the saturator 60 where $H_2O$ is added to the gas in order to adjust it for carbon control in the direct reduction shaft furnace 10.

Additional BOFG is combined directly with the top gas fuel stream through a conduit 33. Additional COG is sent to the auxiliary burners of the indirect heater 70 through one or more conduits 53 and 54 and to the transition zone of the direct reduction shaft furnace 10, as transition zone injection gas, through one or more other conduits 53 and 55. The gas from the saturator 60 flows through a conduit 61 to the indirect heater 70, where the gas is heated to near reduction temperature by the burners fueled by the combination of spent direct reduction furnace off gas and BOFG, as well as the auxiliary burners fueled by COG, for example.

Combustion air is preheated by heat exchange with heater flue gas. The hot gas from the indirect heater 70 leaves through a conduit 71 and $O_2$ from the oxygen source 80 is added via another conduit 81 to raise the temperature of the gas to 1000 degrees C. or higher. The gas then flows through a further conduit 15, with the elevated temperature required to supply the endothermic load necessary for the in situ reforming in the reduction shaft furnace 10.

In general, COG and BOFG have analyses that may vary depending on the particular raw materials and specific practices at various steel mills throughout the world. The table below provides some non-limiting examples:

|  | COG | BOFG |
|---|---|---|
| CO | 6-7 | 55-72 |
| $CO_2$ | 1-2 | 13-18 |
| $H_2$ | 61-63 | 1-4 |
| $H_2O$ | 1-5 | 1-5 |
| $CH_4$ | 21-24 | 1-3 |
| $N_2$ | 3-7 | 11-20 |

If the COG and BOFG are utilized in the most efficient manner to produce DRI/HDRI/HBI with a minimum amount of COG and/or BOFG without export fuel, there is a specific ratio of COG to BOFG for each analysis of the gases. This ratio may vary from about 0.95 to about 1.25. For BOFG with higher amounts of CO, and consequently lower amounts of $N_2$, the ratio is closer to 0.95. For BOFG with higher amounts of $N_2$, and consequently lower amounts of CO, more COG is required and the ratio is closer to 1.25.

As mentioned above, it is possible to run varying ratios of COG to BOFG outside of the calculated best operating point, but it must be done with export fuel that would have to be consumed elsewhere. One such use of this export fuel could be to raise additional steam for regeneration in the $CO_2$ removal system 40, for example.

As described above, in addition to supplementing the shaft furnace off gas stream and contributing to the eventual reducing gas stream, other contemplated uses for the BOFG include supplementing the shaft furnace off gas stream for use as the top gas fuel for the indirect heater 70 (via conduits 31, 33, and 24). Similarly, in addition to supplementing the shaft furnace off gas stream and contributing to the eventual reducing gas stream, the COG may be used for a variety of other purposes as well.

Figure 2:
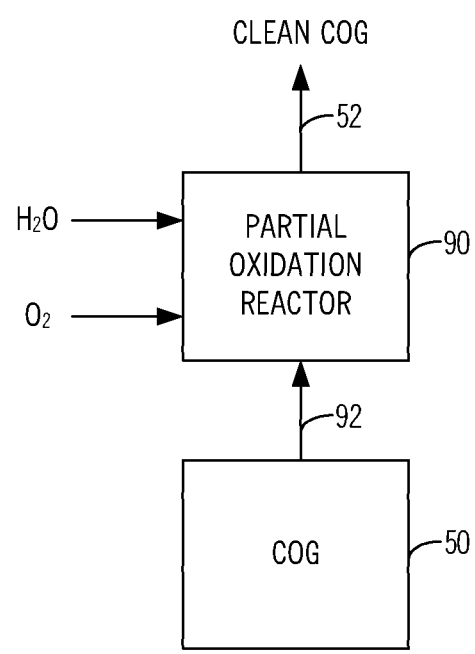
FIG. 2 is a schematic diagram illustrating one exemplary embodiment of a process for removing complex hydrocarbons from the COG in conjunction with the system and method of FIG. 1.

Referring specifically to FIG. 2, the COG from the COG source 50 that is eventually heated in the indirect heater 70 (FIG. 1) is preferably first cleaned of sulfur and complex hydrocarbons that would foul the indirect heater 70 via oxidation processing (i.e. partial combustion) or the like in a partial oxidation reactor 90 or the like, with the addition of $O_2$ and $H_2O$ (i.e. steam). This cleaning process correspondingly reduces, and potentially eliminates, the need for BOFG supplementation, if so desired. The cleaning process is primarily required to deal with the presence of quantities of $NH_3$, $H_2S$, Tars, HCN, Naphthalene, and BTX (Benzol, Toluene, and Xylene) in the COG. Optionally, the cleaning process takes place as a lesser reaction in the ducts of the reducing gas system, as opposed to the partial oxidation reactor 90. The oxidation reaction looks as follows (exemplary only):

COG—7.5% CO, 3.5% $CO_2$, 54% $H_2$, 25.25% $CH_4$, 7.45% $N_2$, 2.3% $C_nH_m$

1 Part Steam to 10 Parts COG

Oxygen Addition for 10 Parts COG:

1.7 Parts Oxygen:
21.38% CO, 2.8% $CO_2$, 61.16% $H_2$, 7.28% $H_2O$, 2.91% $CH_4$, 4.46% N2 Temp. 800 degrees C., 17.1 Parts Product Gas 2 Parts Oxygen:
22.81% CO, 2.54% $CO_2$, 61.74% $H_2$, 8.14% $H_2O$, 0.49% $CH_4$, 4.27% N2 Temp. 880 degrees C., 17.9 Parts Product Gas Referring again specifically to FIG. 1, COG with or without the complex hydrocarbons may also be used to supplement the top gas fuel for the indirect heater 70 (via conduits 53 and 54), as direct reduction shaft furnace transition zone injection gas (via conduits 53 and 55), and/or to enrich the ultimate reducing gas stream (via conduits 53, 54, and 59).

Each of these possibilities is not mutually exclusive and all of these possibilities may be used in any combination.

Figure 3:
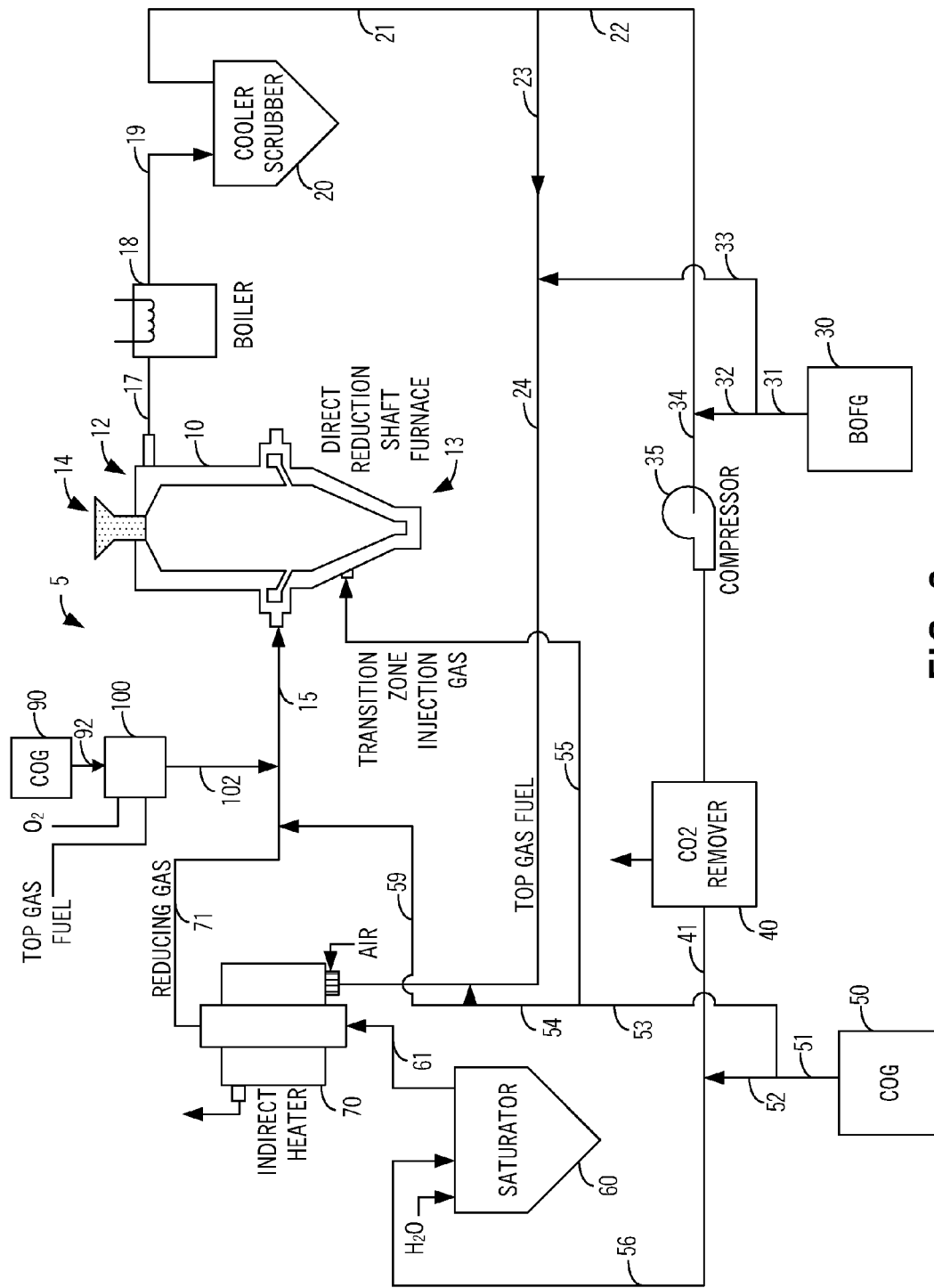
FIG. 3 is a schematic diagram illustrating an alternative exemplary embodiment of the novel system and method for reducing iron oxide to metallic iron using COG of the present invention.

Referring now to FIG. 3, in an alternative exemplary embodiment of the present invention, reformed COG 100 is injected 102 into the system/process stream 15 just prior to the direct reduction shaft furnace 10. Preferably, this COG 100 is reformed COG, as indicated previously, or fresh hot COG, and is from a partial oxidation system, such as a hot oxygen burner (which injects COG 90 into an ultra-hot flame), well known to those of ordinary skill in the art. The reformed COG 100 is hot (between about 1000 degrees C. and about 1600 degrees C.) and is injected 102 into the about 900 degrees C. stream 15. Because of this heat, the oxygen 80 injection 81 described previously (see FIG. 1) becomes optional. The result is less oxygen 80 injection 81 into the system/process 5, while still avoiding the development of carbon soot. This COG 100 injection 102 may be used in place of, or as a complement to, the cooler COG and/or BOFG injection sources and points described previously. For example, the COG 100 injection 102 may be used in conjunction with a standard Midrex natural gas process with a reformer. As such, the previously described $CO_2$ removal system 40 and indirect heater 70 would not be necessary (the reformer would adequately perform both of these functions).

The reformed COG 100 has the following exemplary contents: 2-13% $CH_4$ (at about 1,500 degrees C.-about 1,200 degrees C., respectively), 18.7% CO, 1.7% $CO_2$, 43.4% $H_2$, 17.7% $H_2O$, 3.6% $N_2$, and 1.8% $C_2H_6$, and possibly 0.9% $C_2H_4$ and 1.7% $C_2H_2$. Of course these contents are exemplary only and should not be construed as limiting in any respect.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for reducing iron oxide to metallic iron using coke oven gas (COG), comprising:
   providing a direct reduction shaft furnace for providing off gas;
   providing a COG source for injecting COG into a reducing gas stream comprising at least a portion of the off gas; and
   the direct reduction shaft furnace reducing iron oxide to metallic iron using the reducing gas stream and injected COG;
   wherein COG is also provided in a separate stream to a transition zone of the direct reduction shaft furnace.

2. The method of claim 1, wherein the COG has a temperature of about 1,200 degrees C. or greater upon injection.

3. The method of claim 1, wherein the COG has a $CH_4$ content of between about 2 volume % and about 13 volume %.

4. The method of claim 1, wherein the COG comprises reformed COG.

5. The method of claim 1, wherein the COG comprises fresh hot COG with a temperature of between about 1,000 degrees C. and about 1,600 degrees C.

6. The method of claim 1, wherein the COG source comprises a partial oxidation system.

7. The method of claim 1, wherein the COG source comprises an oxygen burner.

8. The method of claim 1, further comprising providing a basic oxygen furnace gas (BOFG) source for injecting BOFG into the off gas that forms at least a portion of the reducing gas stream.

9. The method of claim 8, further comprising providing a carbon dioxide ($CO_2$) removal system for removing $CO_2$ from the mixture of the off gas and the BOFG.

10. A method for reducing iron oxide to metallic iron, comprising: reducing the iron oxide to the metallic iron in a direct reduction shaft furnace using a reducing gas that comprises a mixture of off gas from the direct reduction shaft furnace and coke oven gas (COG) from a COG source, wherein COG is also provided in a separate stream to a transition zone of the direct reduction shaft furnace.

11. The method of claim 10, wherein the COG has a temperature of about 1,200 degrees C. or greater upon mixing.

12. The method of claim 10, wherein the COG has a $CH_4$ content of between about 2 volume % and about 13 volume %.

13. The method of claim 10, wherein the COG comprises reformed COG.

14. The method of claim 10, wherein the COG source comprises an oxygen burner.

15. A system for reducing iron oxide to metallic iron using coke oven gas (COG), comprising:
   a direct reduction shaft furnace for providing off gas;
   a COG source for injecting COG into a reducing gas stream comprising at least a portion of the off gas; and
   the direct reduction shaft furnace reducing iron oxide to metallic iron using the reducing gas stream and injected COG;
   wherein COG is also provided in a separate stream to a transition zone of the direct reduction shaft furnace.

16. The system of claim 15, wherein the COG has a temperature of about 1,200 degrees C. or greater upon injection.

17. The system of claim 15, wherein the COG has a $CH_4$ content of between about 2 volume % and about 13 volume %.

18. The system of claim 15, wherein the COG comprises reformed COG.

19. The system of claim 1, wherein the COG comprises fresh hot COG with a temperature of between about 1,000 degrees C. and about 1,600 degrees C.

20. The system of claim 15, wherein the COG source comprises a partial oxidation system.

21. The system of claim 15, wherein the COG source comprises an oxygen burner.

22. The system of claim 15, further comprising a basic oxygen furnace gas (BOFG) source for injecting BOFG into the off gas that forms at least a portion of the reducing gas stream.

23. The system of claim 22, further comprising a carbon dioxide ($CO_2$) removal system for removing $CO_2$ from the mixture of the off gas and the BOFG.

* * * * *